US012651481B2

(12) United States Patent
Uchida

(10) Patent No.: US 12,651,481 B2
(45) Date of Patent: Jun. 9, 2026

(54) DETERMINATION METHOD AND INFORMATION PROCESSING APPARATUS FOR SEPARATING AND QUANTIFYING FACIAL EXPRESSIONS

(71) Applicant: FUJITSU LIMITED, Kawasaki (JP)

(72) Inventor: Akiyoshi Uchida, Akashi (JP)

(73) Assignee: Fujitsu Limited, Kawasaki (JP)

( * ) Notice: Subject to any disclaimer, the term of this patent is extended or adjusted under 35 U.S.C. 154(b) by 529 days.

(21) Appl. No.: 17/866,563

(22) Filed: Jul. 18, 2022

(65) Prior Publication Data

US 2023/0130397 A1 Apr. 27, 2023

(30) Foreign Application Priority Data

Oct. 22, 2021 (JP) ................................. 2021-173488

(51) Int. Cl.
*G06V 40/16* (2022.01)
*G06T 7/73* (2017.01)

(52) U.S. Cl.
CPC .............. *G06V 40/176* (2022.01); *G06T 7/73* (2017.01); *G06T 2207/30201* (2013.01); *G06T 2207/30204* (2013.01)

(58) Field of Classification Search
CPC .... G06V 40/176; G06V 10/82; G06V 40/174; G06T 7/73; G06T 2207/30201; G06T 2207/30204; G06T 2207/20084
See application file for complete search history.

(56) References Cited

U.S. PATENT DOCUMENTS

2017/0286759 A1   10/2017   Yao et al.
2018/0114057 A1*   4/2018   Kim ..................... G06V 40/161
(Continued)

FOREIGN PATENT DOCUMENTS

EP          3709131 A1 *   9/2020   .............. G06F 3/011
GB          2592076 A  *   8/2021   ........... G06F 18/214
(Continued)

OTHER PUBLICATIONS

Vasanthan, M., et al. "Facial expression based computer cursor control system for assisting physically disabled person." 2012 IEEE International Conference on Communication, Networks and Satellite (ComNetSat). IEEE, 2012. (Year: 2012).*

(Continued)

*Primary Examiner* — Henok Shiferaw
*Assistant Examiner* — Toluwani Mary-Jane Ijaseun
(74) *Attorney, Agent, or Firm* — XSENSUS LLP

(57) ABSTRACT

A non-transitory computer-readable recording medium stores a program for causing a computer to execute a process, the process includes obtaining an image that includes a face to which a first marker and a second marker are attached, identifying a first position of the first marker included in the image and a second position of the second marker included in the image, determining intensity of a specific facial expression in the face based on a first difference between the first position and a first reference position of the first marker and a second difference between a first positional relationship between the first position and the second position and a second positional relationship between the first reference position and a second reference position of the second marker, and outputting the determined intensity of the specific facial expression in association with the image.

15 Claims, 17 Drawing Sheets

(56)                References Cited

U.S. PATENT DOCUMENTS

| | | | | |
|---|---|---|---|---|
| 2018/0144185 A1* | 5/2018 | Yoo | ..................... | G06V 40/175 |
| 2019/0205626 A1* | 7/2019 | Kim | ..................... | G06V 40/161 |
| 2019/0294868 A1 | 9/2019 | Martinez | | |
| 2020/0286284 A1* | 9/2020 | Grabli | .................... | G06T 13/40 |

FOREIGN PATENT DOCUMENTS

| | | | | | |
|---|---|---|---|---|---|
| JP | 2009087303 A | * | 4/2009 | | |
| JP | 2020-160792 A | | 10/2020 | | |
| KR | 102138809 B1 | * | 7/2020 | ............. | G06V 10/82 |
| WO | WO-2020222785 A1 | * | 11/2020 | ............. | G06F 18/22 |
| WO | WO-2023081138 A1 | * | 5/2023 | ........... | G06V 40/175 |

OTHER PUBLICATIONS

Tian, Y-I., Takeo Kanade, and Jeffrey F. Cohn. "Recognizing action units for facial expression analysis." IEEE Transactions on pattern analysis and machine intelligence 23.2 (2001): 97-115. (Year: 2001).*

Chin, Seongah, and Kyoung-Yun Kim. "Emotional intensity-based facial expression cloning for low polygonal applications." IEEE Transactions on Systems, Man, and Cybernetics, Part C (Applications and Reviews) 39.3 (2009): 315-330. (Year: 2009).*

Kaiser, Susanne, and Thomas Wehrle. "Automated coding of facial behavior in human-computer interactions with FACS." Journal of Nonverbal Behavior 16 (1992): 67-84. (Year: 1992).*

Sulistiyono et al.. "Toward to an exaggeration engine for facial animation: Evaluating the difference of RBF implementation in expression-marker transfer." 2017 International Conference on Smart Cities, Automation & Intelligent Computing Systems (ICON-SONICS). IEEE, 2017. (Year: 2017).*

Dagnes, Nicole, et al. "Optimal marker set assessment for motion capture of 3D mimic facial movements." Journal of biomechanics 93 (2019): 86-93. (Year: 2019).*

Maruthapillai, Vasanthan, and Murugappan Murugappan. "Optimal geometrical set for automated marker placement to virtualized real-time facial emotions." PLoS One 11.2 (2016): e0149003. (Year: 2016).*

Murugappan, M., and A. J. P. O. Mutawa. "Facial geometric feature extraction based emotional expression classification using machine learning algorithms." Plos one 16.2 (2021): e0247131. (Year: 2021).*

* cited by examiner

FIG. 1

VARIATION VALUE OF IR MARKER FROM NORMAL
CONDITION VALUE (STATE 0)

AU4 INTENSITY CONVERTED FROM
MARKER MOVEMENT AMOUNT

FIG. 14

DETERMINATION METHOD AND INFORMATION PROCESSING APPARATUS FOR SEPARATING AND QUANTIFYING FACIAL EXPRESSIONS

CROSS-REFERENCE TO RELATED APPLICATION

This application is based upon and claims the benefit of priority of the prior Japanese Patent Application No. 2021-173488, filed on Oct. 22, 2021, the entire contents of which are incorporated herein by reference.

FIELD

The embodiment discussed herein is related to a determination method and an information processing apparatus.

BACKGROUND

Facial expressions play an important role in nonverbal communication. Techniques of estimating facial expressions are important to understand people and to sense people. A method called an action unit (AU) is known as a tool for estimating facial expressions. The AU is a method of separating and quantifying facial expressions on the basis of facial parts and facial expression muscles.

An AU estimation engine has its basis in machine learning based on a large volume of training data, and image data of facial expressions and Occurrence (presence/absence of occurrence) and Intensity (occurrence intensity) of each AU are used as training data. Furthermore, Occurrence and intensity of the training data are subject to annotation by a specialist called a coder.

U.S. Patent Application Publication No. 2019/0294868, U.S. Patent Application Publication No. 2017/0286759, and Japanese Laid-open Patent Publication No. 2020-160792 are disclosed as related art.

SUMMARY

According to an aspect of the embodiment, a non-transitory computer-readable recording medium stores a program for causing a computer to execute a process, the process includes obtaining an image that includes a face to which a first marker and a second marker are attached, identifying a first position of the first marker included in the image and a second position of the second marker included in the image, determining intensity of a specific facial expression in the face based on a first difference between the first position and a first reference position of the first marker and a second difference between a first positional relationship between the first position and the second position and a second positional relationship between the first reference position and a second reference position of the second marker, and outputting the determined intensity of the specific facial expression in association with the image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating an exemplary configuration of a machine learning system;

FIG. 14 is a diagram illustrating an exemplary method of marker deletion;

DESCRIPTION OF EMBODIMENT

Figure 2:
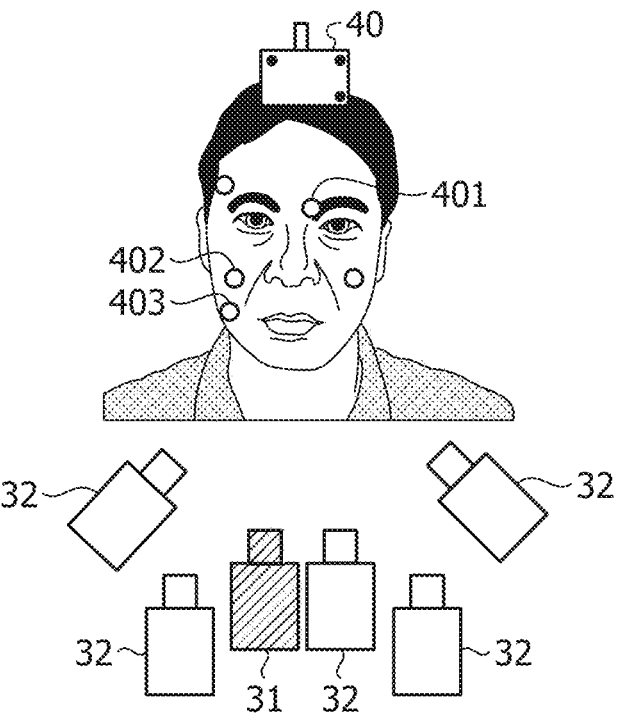
FIG. 2 is a diagram illustrating exemplary arrangement of cameras.

Existing methods have a problem that it may be difficult to generate training data for estimating facial expressions. For example, annotation by a coder is costly and time-consuming, and it is difficult to create a large volume of data, accordingly. Furthermore, according to movement measurement of each facial part based on image processing of facial images, it is difficult to accurately capture small changes, and it is difficult for a computer to make AU determination from the facial images without human judgment. Accordingly, it is difficult for a computer to generate training data in which AU labels are assigned to facial images without human judgment.

Hereinafter, an embodiment of a determination method and an information processing apparatus according to the present application will be described with reference to the accompanying drawings. The present embodiment merely describes an example or aspect, and such exemplification does not limit numerical values, a range of functions, usage scenes, and the like.

Figure 1:
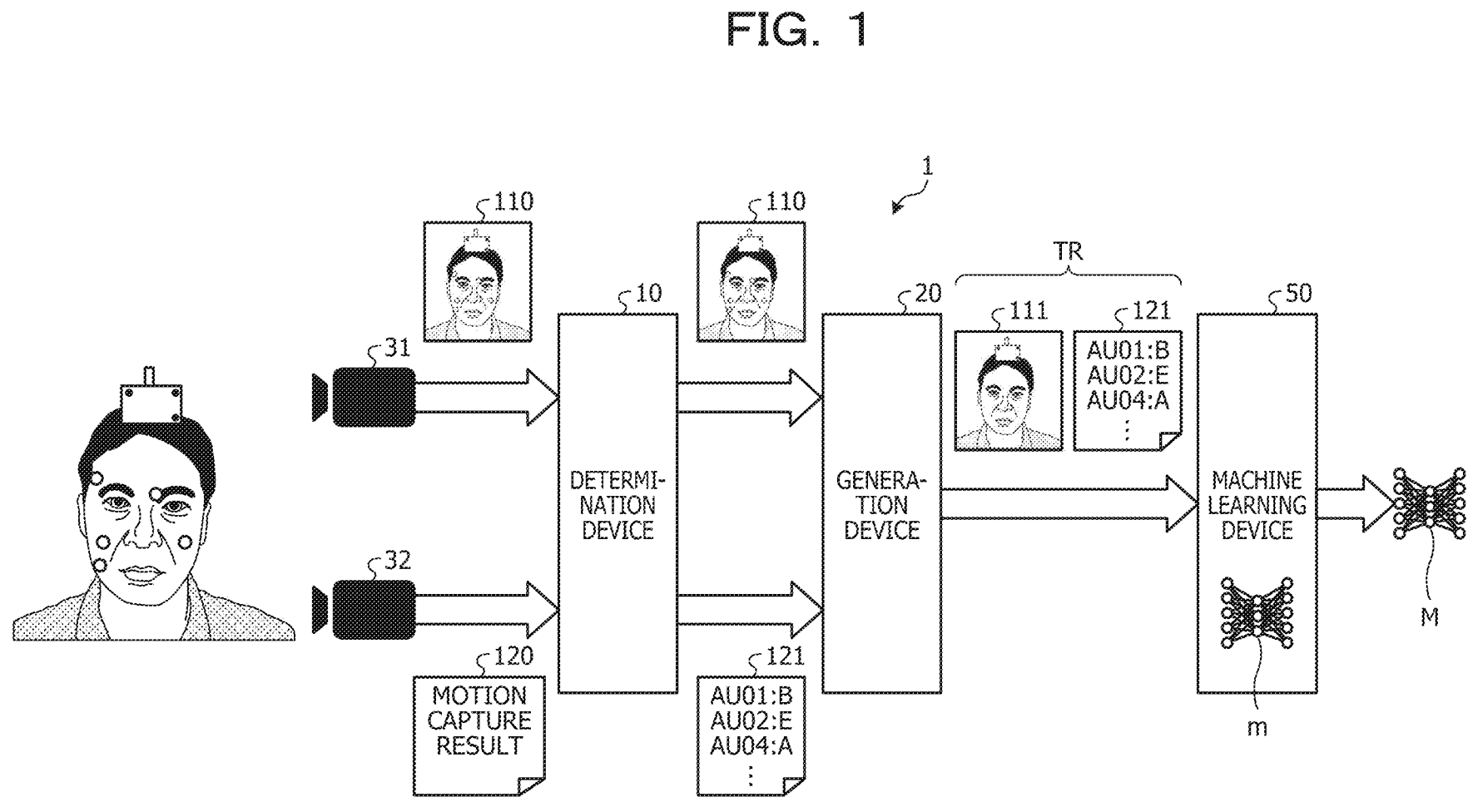

An exemplary configuration of a machine learning system according to an embodiment will be described with reference to FIG. 1. FIG. 1 is a diagram illustrating an exemplary configuration of the machine learning system. As illustrated in FIG. 1, a machine learning system 1 includes a Red, Green, Blue (RGB) camera 31, an infrared (IR) camera 32, a determination device 10, a generation device 20, and a machine learning device 50.

As illustrated in FIG. 1, the RGB camera 31 and the IR camera 32 may be arranged in a state of facing a face of a person to which markers are attached. For example, the RGB camera 31 is a commonly used digital camera, which receives visible light and generates an image. Furthermore, for example, the IR camera 32 senses infrared rays. Furthermore, the markers are, for example, IR reflection (retroreflection) markers. The IR camera 32 is capable of performing motion capture by utilizing IR reflection by the markers. Furthermore, in the following descriptions, the person to be imaged will be referred to as a subject.

The determination device 10 obtains an image 110 captured by the RGB camera 31, and a motion capture result 120 by the IR camera 32. Then, the determination device 10 determines AU Intensity 121 for each AU on the basis of a movement amount of the marker assigned to each AU. Thereafter, the determination device 10 outputs the AU Intensity 121 to the generation device 20 in association with the image 110 captured by the RGB camera 31.

The "Intensity" referred to here may be, as merely an example, data in which intensity of occurrence of each AU is expressed on a five-point scale of A to E and annotation is carried out such as "AU1: 2, AU2: 5, AU4: 1, and so on". Note that the Intensity is not limited to that expressed on the five-point scale, and may be expressed by a two-step evaluation (presence/absence of occurrence), for example. In this case, as merely an example, while it may be expressed as "present" when the evaluation is two or more out of the five-point scale, it may be expressed as "absent" when the evaluation is less than two.

The generation device 20 obtains the image 110 of the RGB camera 31 and the AU Intensity 121 output by the determination device 10. Then, the generation device 20 generates an image 111 in which the markers are deleted by image processing from the image 110 captured by the RGB camera 31. Moreover, the generation device 20 generates a data set including training data TR in which the image 111 in which the markers have been deleted and the AU Intensity 121 as a correct answer label are associated with each other. Thereafter, the generation device 20 outputs the data set of the training data TR to the machine learning device 50.

The machine learning device 50 carries out machine learning using the data set of the training data TR output from the generation device 20. For example, machine learning device 50 trains a machine learning model m according to a machine learning algorithm, such as deep learning, using the image 111 in which the markers have been deleted as an explanatory variable of the machine learning model m and using the AU Intensity 121 as the correct answer label as an objective variable of the machine learning model m. As a result, a machine learning model M for estimating the AU Intensity from the image is generated.

Next, arrangement of cameras will be described with reference to FIG. 2. FIG. 2 is a diagram illustrating exemplary arrangement of cameras. As illustrated in FIG. 2, a plurality of the IR cameras 32 may form a marker tracking system. In that case, the marker tracking system may detect a position of an IR reflection marker by stereo imaging. Furthermore, it is assumed that a relative positional relationship between each of the plurality of IR cameras 32 is corrected in advance by camera calibration.

Furthermore, a plurality of markers is attached to the face of the subject to be imaged to cover the target AUs (e.g., AU1 to AU28). Positions of the markers change according to a change in a facial expression of the subject. For example, a marker 401 is arranged near the root of an eyebrow. Furthermore, a marker 402 and a marker 403 are arranged near a nasolabial fold. The markers may be arranged on the skin corresponding to movement of one or more AUs and facial expression muscles. Furthermore, the markers may be arranged to exclude the positions on the skin where a texture change is larger due to being wrinkled and the like.

Moreover, the subject wears an instrument 40 to which reference point markers are attached. It is assumed that the positions of the reference point markers attached to the instrument 40 do not change even when the facial expression of the subject changes. Accordingly, the determination device 10 is enabled to detect a positional change of the markers attached to the face on the basis of a change in the position relative to the reference point markers. Furthermore, with the number of the reference point markers set to three or more, the determination device 10 is enabled to identify the positions of the markers in the three-dimensional space.

The instrument 40 is, for example, a headband, which arranges the reference point markers outside the contour of the face. Furthermore, the instrument 40 may be a virtual reality (VR) headset, a mask made of a hard material, or the like. In that case, the determination device 10 may use the rigid surfaces of the instrument 40 as the reference point markers.

Figure 3:
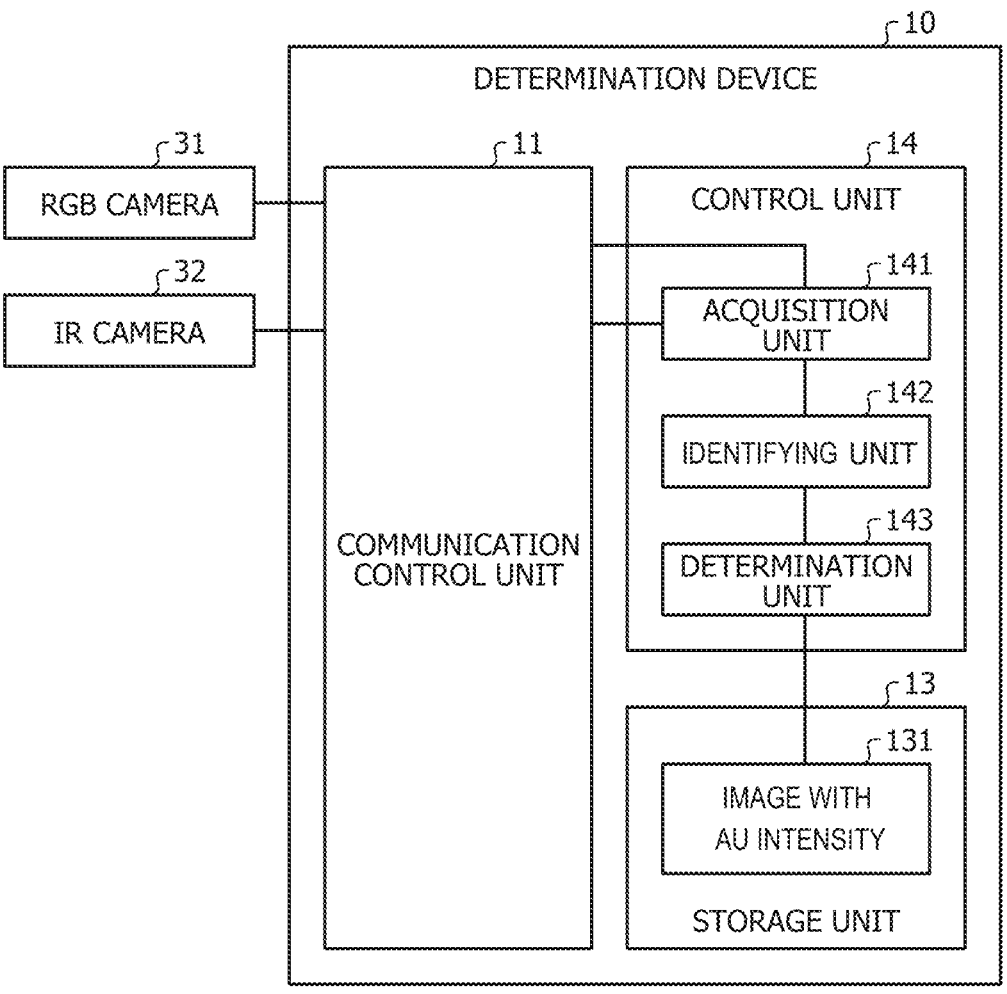
FIG. 3 is a block diagram illustrating an exemplary functional configuration of a determination device.

Next, an exemplary functional configuration of the determination device 10 will be described with reference to FIG. 3. FIG. 3 is a block diagram illustrating an exemplary functional configuration of the determination device 10. As illustrated in FIG. 3, the determination device 10 includes a communication control unit 11, a storage unit 13, and a control unit 14. Note that the determination device 10 may further include, in addition to the functional units illustrated in FIG. 3, functional units included in the generation device 20 and the machine learning device 50, which are, for example, a function of generating training data, a function of executing machine learning, and the like.

The communication control unit 11 is a functional unit that controls communication with other devices such as cameras, the generation device 20, and the like. For example, the communication control unit 11 may be implemented by a network interface card such as a local area network (LAN) card or the like. As one aspect, the communication control unit 11 receives the image 110 captured by the RGB camera 31, or receives the motion capture result 120 by the IR camera 32. As another aspect, the communication control unit 11 outputs the image 110 of the RGB camera 31 associated with the AU Intensity 121 to the generation device 20.

The storage unit 13 is a functional unit that stores various types of data. As merely an example, the storage unit 13 is implemented by storage, for example, internal, external, or auxiliary storage. For example, the storage unit 13 stores an image 131 of the RGB camera 31 associated with the AU Intensity. The storage unit 13 is also capable of storing, in addition to such an image 131, various types of data such as correspondence information indicating a correspondence relationship between the marker and the AU, and the like.

The control unit 14 is a processing unit that performs overall control of the determination device 10. For example, the control unit 14 is implemented by a hardware processor. In addition, the control unit 14 may be implemented by hard-wired logic. As illustrated in FIG. 3, the control unit 14 includes an acquisition unit 141, an identifying unit 142, and a determination unit 143.

The acquisition unit 141 obtains a captured image including the face. For example, the acquisition unit 141 obtains the captured image including the face in which multiple markers are attached to multiple positions corresponding to multiple AUs. The acquisition unit 141 obtains an image captured by the RGB camera 31.

Here, when the IR camera 32 and the RGB camera 31 carry out imaging, the subject changes his or her facial expression. Accordingly, the determination device 10 is enabled to obtain, as an image, how the facial expression changes as time passes. Furthermore, the RGB camera 31 may capture a moving image. A moving image may be regarded as a plurality of still images arranged in time series. Furthermore, the subject may change the facial expression freely, or may change the facial expression according to a predetermined scenario.

The identifying unit 142 identifies the positions of the markers included in the captured image. The identifying unit 142 identifies the position of each of the plurality of markers included in the captured image. Moreover, in a case where multiple images are obtained in time series, the identifying unit 142 identifies the positions of the markers for each image. Furthermore, the identifying unit 142 is capable of identifying coordinates of each marker on the plane or in the space on the basis of the positional relationship with the reference point markers attached to the instrument 40. Note that the identifying unit 142 may determine the positions of the markers from the reference coordinate system, or may determine them from the projection position of the reference plane.

The determination unit 143 determines whether or not each of the plurality of AUs has occurred on the basis of the AU determination criterion and the positions of the plurality of markers. The determination unit 143 determines the Intensity for one or more occurred AUs among the plurality of AUs. At this time, in a case where the AU corresponding to the marker among the plurality of AUs is determined to have occurred on the basis of the determination criterion and the position the marker, the determination unit 143 may select the AU corresponding to the marker.

For example, the determination unit 143 determines Intensity of a first AU on the basis of a movement amount of a first marker calculated on the basis of a distance between the reference position of the first marker associated with the first AU included in the AU determination criterion and the position of the first marker identified by the identifying unit 142. Note that, it may be said that the first marker is one or a plurality of markers corresponding to a specific AU.

The AU determination criterion indicates, for example, one or a plurality of markers, among the plurality of markers, used to determine AU Intensity for each AU. The AU determination criterion may include reference positions of the plurality of markers. The AU determination criterion may include, for each of the plurality of AUs, a relationship (conversion rule) between the Intensity and the movement amount of the marker used to determine the Intensity. Note that the reference position of the marker may be determined according to each position of the plurality of markers in the captured image in which the subject is in an expressionless state (no AU has occurred).

Figure 4:
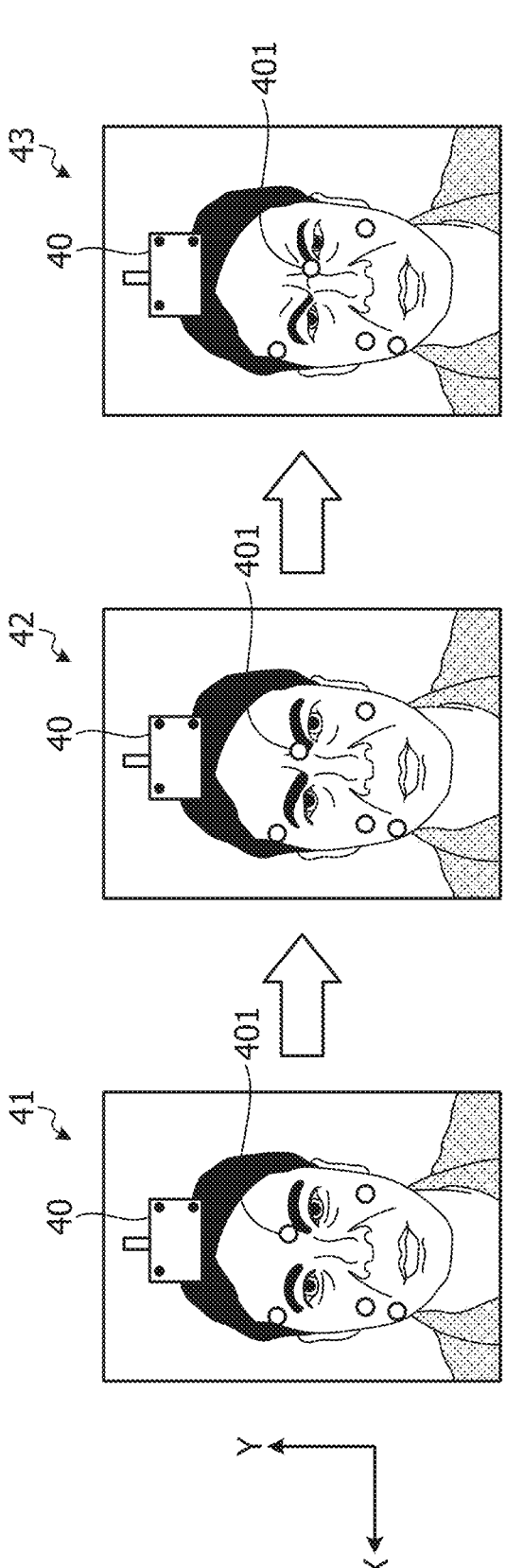
FIG. 4 is a diagram illustrating exemplary movement of a marker.

Here, marker movement will be described with reference to FIG. 4. FIG. 4 is a diagram illustrating exemplary movement of the markers. Images 41 to 43 in FIG. 4 are images captured by the RGB camera 31. Furthermore, it is assumed that the images are captured in the order of the image 41, the image 42, and the image 43. For example, the image 41 is an image when the subject is expressionless. The determination device 10 may regard the position of the marker in the image 41 as a reference position where the movement amount is 0.

As illustrated in FIG. 4, the subject gives a facial expression of drawing the eyebrows together. At this time, the position of the marker 401 moves downward as the facial expression changes. At that time, the distance between the position of the marker 401 and the reference point markers attached to the instrument 40 increases.

Figure 5:
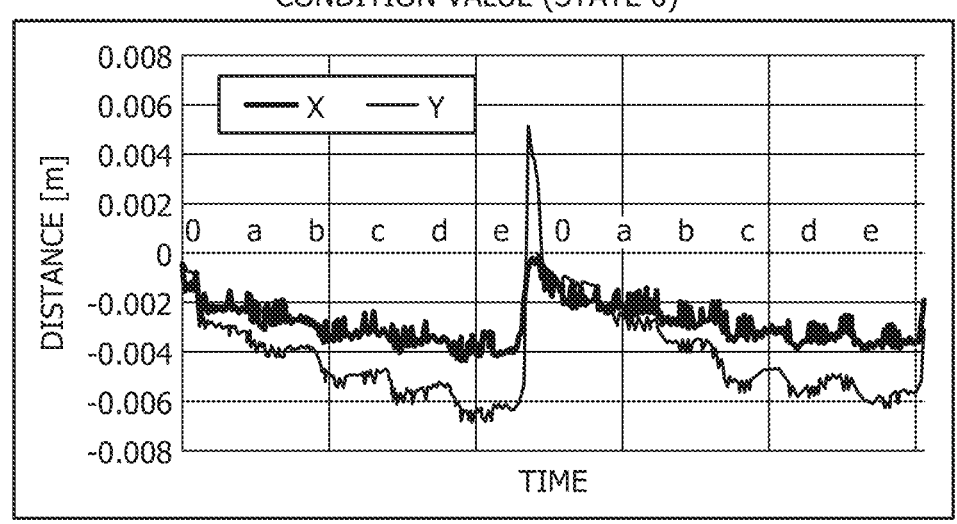
FIG. 5 is a diagram illustrating an exemplary method of determining Intensity.
Figure 5:
Figure 5:
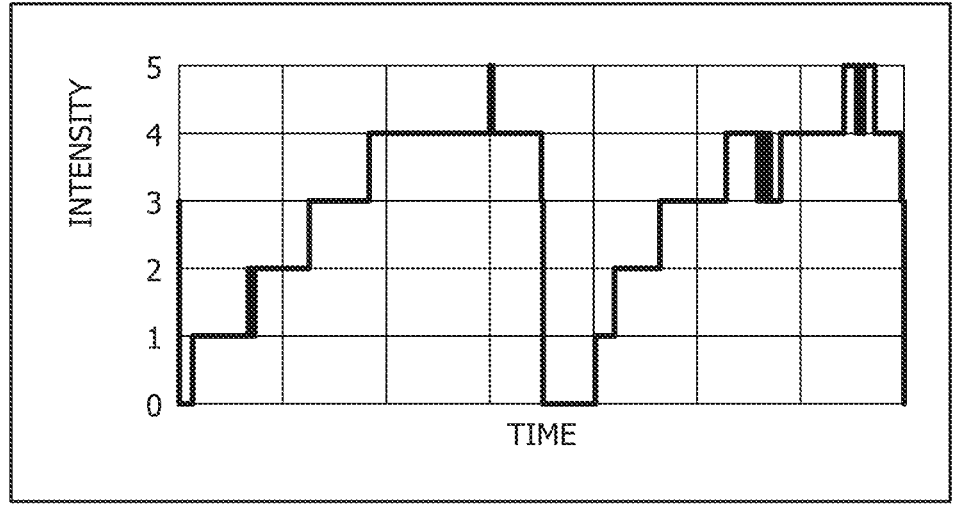

Furthermore, a variation value of the distance between the marker 401 and the reference point markers in the X direction and the Y direction is indicated in FIG. 5. FIG. 5 is a diagram illustrating an exemplary method of determining Intensity. As illustrated in FIG. 5, the determination unit 143 is capable of converting the variation value into the Intensity. Note that the Intensity may be quantized on a five-point scale according to a facial action coding system (FACS), or may be defined as a continuous quantity based on the variation amount.

Various rules may be considered as a rule for the determination unit 143 to convert the variation amount into the Intensity. The determination unit 143 may perform conversion according to one predetermined rule, or may perform conversion according to a plurality of rules to adopt the one with the highest Intensity.

For example, the determination unit 143 may in advance obtain the maximum variation amount, which is the variation amount when the subject changes the facial expression most, and may convert the Intensity on the basis of the ratio of the variation amount to the maximum variation amount. Furthermore, the determination unit 143 may determine the maximum variation amount using data tagged by the coder by the existing method. Furthermore, the determination unit 143 may linearly convert the variation amount into the Intensity. Furthermore, the determination unit 143 may perform the conversion using an approximation formula created by preliminary measurement of a plurality of subjects.

Furthermore, for example, the determination unit 143 may determine the Intensity on the basis of a motion vector of the first marker calculated on the basis of the position preset as the determination criterion and the position of the first marker identified by the identifying unit 142. In this case, the determination unit 143 determines the Intensity of the first AU on the basis of a degree of matching between the motion vector of the first marker and a reference vector defined in advance for the first AU. Furthermore, the determination unit 143 may correct the correspondence between the Intensity and the magnitude of the vector using an existing AU estimation engine.

Figure 6:
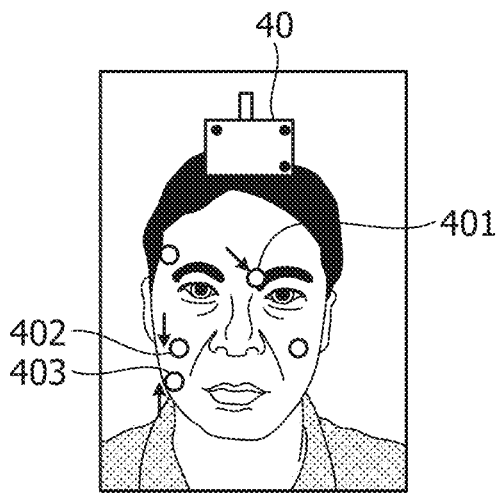
FIG. 6 is a diagram illustrating an exemplary method of determining Intensity.

FIG. 6 is a diagram illustrating an exemplary method of determining Intensity. For example, it is assumed that an AU4 reference vector corresponding to the AU4 is determined in advance as (−2 mm, −6 mm). At this time, the determination unit 143 calculates an inner product of the AU4 reference vector and the motion vector of the marker 401, and normalizes the magnitude of the AU4 reference vector. Here, when the inner product matches the magnitude of the AU4 reference vector, the determination unit 143 determines that the Intensity of the AU4 is 5 on the five-point scale. Meanwhile, when the inner product is half of the AU4 reference vector, for example, the determination unit 143 determines that the Intensity of the AU4 is 3 on the five-point scale in the case of the linear conversion rule mentioned above.

Figure 7:
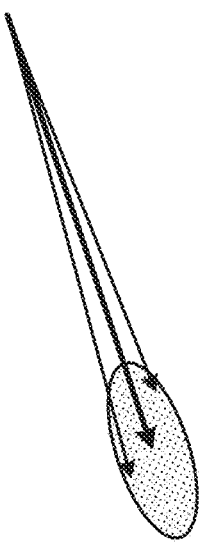
FIG. 7 is a diagram illustrating an exemplary AU4 reference vector.

FIG. 7 is a diagram illustrating an example of the AU4 reference vector. In FIG. 7, the AU4 reference vector (−2 mm, −6 mm) corresponding to the AU4 is illustrated by a thick line. Moreover, in FIG. 7, individual motion vectors of the marker 401 corresponding to the AU4 are illustrated by a thin line, and a range in which the individual motion vectors may be dispersed is illustrated by hatching. As illustrated by the hatching in FIG. 7, while the motion vector of the AU4 of each individual has a variance, it is possible to extract only the AU4 reference vector component by calculating the inner product for a single AU4 reference vector. Moreover, since the dispersion angle of individual differences is small, the determination accuracy of the Intensity of the AU4 is less affected even when the setting accuracy of the AU4 reference vector is not high enough.

Furthermore, in FIG. 6, it is assumed that magnitude of an AU11 reference vector corresponding to an AU11 is determined in advance as 3 mm, for example. At this time, when the variation amount of the distance between the marker 402 and the marker 403 matches the magnitude of the AU11 reference vector, the determination unit 143 determines that the Intensity of the AU11 is 5 on the five-point scale. Meanwhile, when the variation amount of the distance is half of the AU11 reference vector, for example, the determination unit 143 determines that the Intensity of the AU11 is 3 on the five-point scale in the case of the linear conversion rule mentioned above. In this manner, the determination unit 143 is capable of determining the Intensity on the basis of the change in the distance between the position of the first marker identified by the identifying unit 142 and a position of a second marker.

In addition to the determination method of determining the AU Intensity on the basis of the change in the movement amount of the marker from the reference position based on the position of the marker when there is no facial expression as described above, it is also possible that the determination unit 143 applies a method of determining the AU Intensity of a different AU to a specific AU.

Figure 8A:
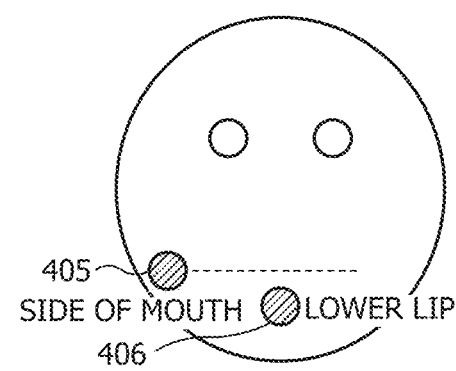
FIG. 8A is a diagram illustrating exemplary marker positions.
Figure 8B:
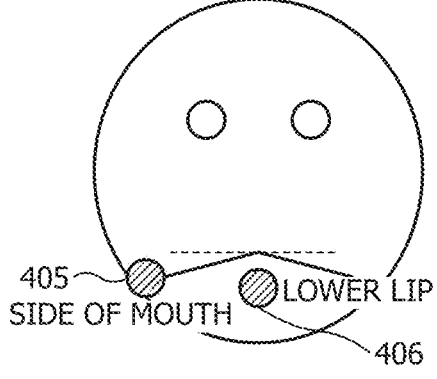
FIG. 8B is a diagram illustrating exemplary marker positions.
Figure 8C:
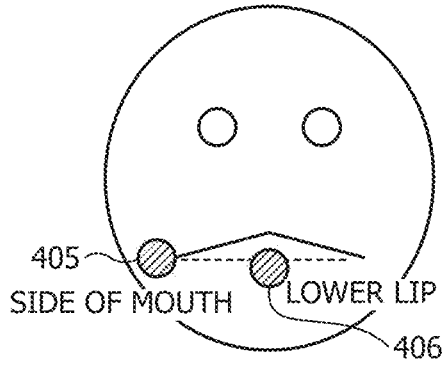
FIG. 8C is a diagram illustrating exemplary marker positions.
Figure 9:
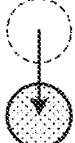
FIG. 9 is a diagram illustrating an exemplary marker movement amount.
Figure 10:
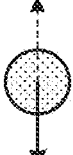
FIG. 10 is a diagram illustrating an exemplary marker movement amount.

For example, in a specific AU, there may be a difference in the appearance of the change in the movement amount of the marker between a case where the specific AU occurs alone and a case where the specific AU occurs simultaneously with another AU. FIGS. 8A to 8C are diagrams illustrating exemplary marker positions. FIGS. 8A to 8C illustrate a position of a marker 405 used to observe an AU15 as merely an example. FIG. 8A illustrates the position of the marker 405 in a no facial expression state in which the facial expression of the subject is neutral. FIG. 8B illustrates the position of the marker 405 when the AU15 occurs alone. FIG. 8C illustrates the position of the marker 405 when the AU15 occurs simultaneously with an AU17. FIGS. 9 and 10 are diagrams illustrating an exemplary marker movement amount. FIGS. 9 and 10 illustrate the movement amount of the marker 405 for observing the AU15. In FIGS. 9 and 10, while the silhouette of the marker 405 when there is no facial expression is illustrated by a broken line, the silhouette of the marker 405 when the AU15 occurs is illustrated by a solid line. The movement of the marker 405 when the AU15 occurs is indicated by a solid arrow in FIGS. 9 and 10, and the movement of the marker 405 when the AU17 occurs is indicated by a dashed arrow in FIG. 10.

As illustrated in FIGS. 8A to 8C, the marker 405 attached to the side of the mouth is used to estimate the AU15. For example, when the AU15 occurs alone, the marker 405 for observing the AU15 moves from the reference position of the marker 405 illustrated in FIG. 8A to the position of the marker 405 illustrated in FIG. 8B. For example, as illustrated in FIG. 9, the marker 405 for observing the AU15 moves downward due to the movement of the marker 405 that appears with the occurrence of the AU15, whereby the displacement in the Y-axis minus direction from the reference position when there is no facial expression is observed as the movement amount of the marker 405. Meanwhile, when the AU15 occurs simultaneously with the AU17, the marker 405 for observing the AU15 transitions from the reference position of the marker 405 illustrated in FIG. 8A to the position of the marker 405 illustrated in FIG. 8C. In this case, as illustrated in FIG. 10, it may be difficult to observe the displacement in the Y-axis minus direction as the movement amount when the movement (solid arrow) of the marker 405 that appears with the occurrence of the AU15 is affected by the movement (dashed arrow) that accompanies the occurrence of the AU17.

In this case, the similarity between the AU15 and the AU17 at the time of the simultaneous occurrence may be lowered even when the similarity between an AU15 reference vector (0 mm, −1 mm) corresponding to the AU15 and the motion vector of the marker 405 for observing the AU15, for example, the inner product, is calculated.

In view of the above, in a case of determining the Intensity of a specific marker including the AU15, the determination unit 143 uses a relative positional relationship of a plurality of markers when there is no facial expression as a reference to determine the Intensity of the specific marker on the basis of the change amount of the relative positional relationship.

Hereinafter, the AU15 will be exemplified as merely an example of the specific AU. For example, in determining the Intensity of the AU15, the marker 405 attached to the side of the mouth is used as an example of the first marker, and a marker 406 attached to the lower lip is used as an example of the second marker. Note that, although an example of using two markers is exemplified here, three or more markers may be used.

The relative positional relationship described above may be defined in any number of dimensions. For example, while the relative positional relationship may be defined in three dimensions at the maximum when the position of the marker is expressed in three dimensions, it is not limited to this, and it may be defined by narrowing down to one dimension or two dimensions. As merely an example, a different number of dimensions may be set for each specific AU in the relative positional relationship, and the number of dimensions that defines the relative positional relationship may be narrowed down on the basis of the size of each component included in the AU reference vector. For example, in the case of the AU15 reference vector expressed by the expression (1) set out below, the X component of the AU15 reference vector<the Y component of the AU15 reference vector, whereby it may be narrowed down to one dimension in the Y direction. In this case, the relative positional relationship may be defined by the difference between the Y coordinate of the marker 405 on the side of the mouth and the Y coordinate of the marker 406 on the lower lip, as expressed by the expression (2) set out below. Note that, while an example of narrowing down the number of dimensions to the component with the maximum size among the components of the AU reference vector is exemplified here, the number of dimensions may be narrowed down to a component with a size equal to or larger than a threshold value, or a component with a size equal to or smaller than the threshold value may be excluded.

$$AU15 \text{ reference vector: } (0,-1) \tag{1}$$

$$\text{Relative positional relationship: } Y[\text{side of mouth-} \\ \text{lower lip}] \tag{2}$$

Under such definition of the relative positional relationship, the determination unit 143 calculates the similarity with the AU15 reference vector, for example, the inner product, on the basis of the change amount of the relative positional relationship between in the expressionless state and in a state at the time of determination. For example, as expressed by the expression (3) set out below, the change amount of the relative positional relationship and the inner product of the AU15 reference vector are calculated, thereby determining the Intensity of the AU15. For example, according to the expression (3) set out below, a change amount $\Delta Y$ of the relative positional relationship is calculated as follows. For example, the change amount $\Delta Y$ may be calculated from the movement amount of the marker 405 on the side of the mouth in the Y direction from the reference position, which is the displacement of the marker 405 on the side of the mouth in the Y direction, and the movement amount of the marker 406 on the lower lip in the Y direction from the reference position, which is the displacement of the marker 406 on the lower lip in the Y direction.

$$\Delta Y[\text{side of mouth-lower lip}] \cdot (0, -1) \qquad (3)$$

As a result, it becomes possible to determine the Intensity of the AU15 even when the AU15 occurs simultaneously with the AU17. For example, when the AU15 occurs alone, the marker 405 on the side of the mouth and the marker 406 on the lower lip change from the positions illustrated in FIG. 8A to the positions illustrated in FIG. 8B. In this case, while the displacement of the marker 405 on the side of the mouth in the Y-axis minus direction is observed, no displacement of the marker 406 on the lower lip is observed. Accordingly, when the AU15 occurs alone, the inner product calculation expressed by the expression (4) set out below is carried out. In this case, the displacement in the Y-axis minus direction is used for the inner product calculation as the change amount $\Delta Y$ of the relative positional relationship so that the inner product becomes larger than zero, whereby no omission in detecting occurrence of the AU15 occurs, and the Intensity of the AU15 may be determined. Meanwhile, when the AU15 occurs simultaneously with the AU17, the marker 405 on the side of the mouth and the marker 406 on the lower lip change from the positions illustrated in FIG. 8A to the positions illustrated in FIG. 8C. In this case, while no displacement of the marker 405 on the side of the mouth is observed, the displacement of the marker 406 on the lower lip in the Y-axis positive direction is observed. Accordingly, when the AU15 occurs simultaneously with the AU17, the inner product calculation expressed by the expression (5) set out below is carried out. In this case as well, the displacement in the Y-axis minus direction is used for the inner product calculation as the change amount $\Delta Y$ of the relative positional relationship so that the inner product becomes larger than zero, whereby no omission in detecting occurrence of the AU15 occurs, and the Intensity of the AU15 may be determined.

$$\Delta Y[\text{side of mouth}] \cdot (0, -1) \qquad (4)$$

$$\Delta Y[\text{side a mouth-lower lip}] \cdot (0, -1) \qquad (5)$$

Figure 11:
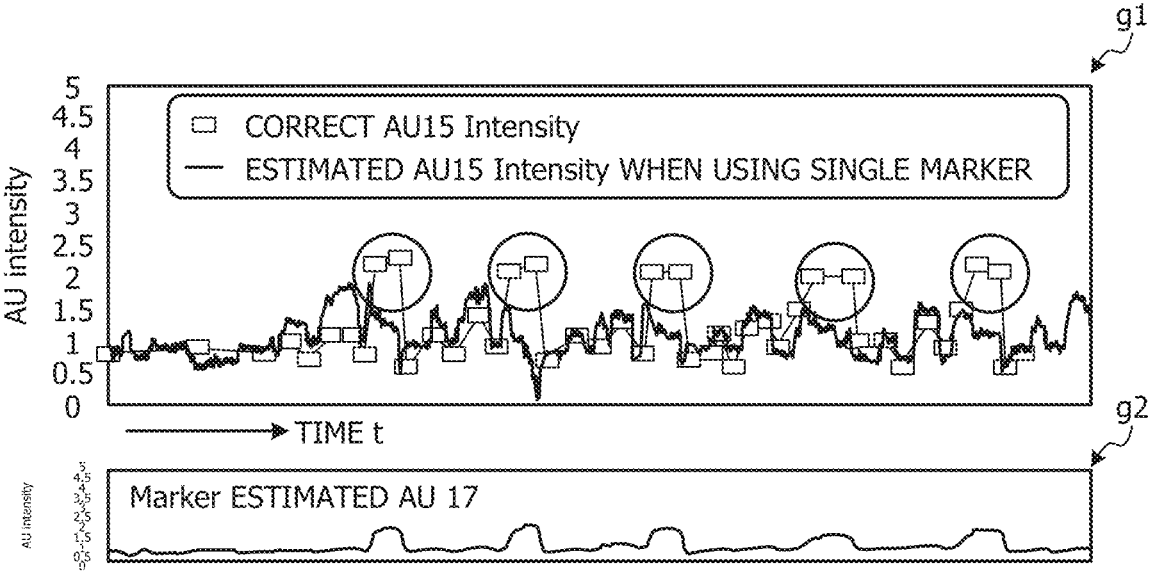
FIG. 11 is a diagram illustrating exemplary estimated values of AU Intensity.
Figure 12:
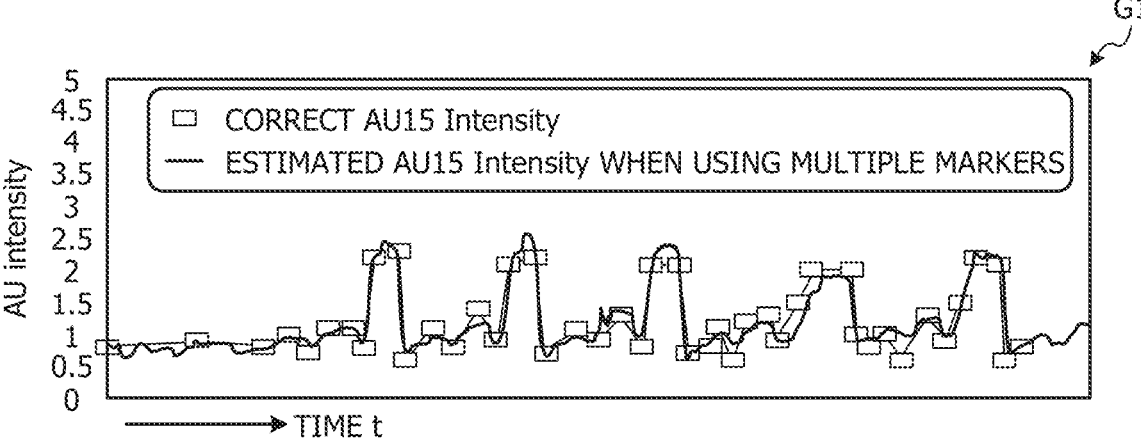
FIG. 12 is a diagram illustrating exemplary estimated values of the AU Intensity.

FIGS. 11 and 12 are diagrams illustrating exemplary estimated values of the AU Intensity. Those FIGS. 11 and 12 illustrate estimated values of the AU Intensity in a case where the RGB camera 31 and the IR camera 32 image a state where the subject repeats the AU15 in the order of Intensity "low", Intensity "medium", and Intensity "high". FIGS. 11 and 12 illustrate graphs in which the horizontal axis represents time and the vertical axis represents AU Intensity. In a graph g1 illustrated in FIG. 11 and in a graph G1 illustrated in FIG. 12, Intensity of the correct answer AU15 is plotted with a rectangular mark as a reference.

The graph g1 illustrated in FIG. 11 indicates the estimated values of the Intensity of the AU15 in a case of determining the Intensity of the AU15 on the basis of the inner product of the motion vector of the marker 405 on the side of the mouth and the AU15 reference vector (0, −1). According to the graph g1 illustrated in FIG. 11, when the Intensity of the AU15 is "low" and "medium", the Intensity of the AU15 in the reference and the estimated value of the Intensity of the AU15 substantially match with each other, whereby it may be seen that the Intensity of the AU15 may be estimated by the marker 405 on the side of the mouth alone. Meanwhile, when the Intensity of the AU15 is "high", the Intensity of the AU15 in the reference and the estimated value of the Intensity of the AU15 deviate from each other. For example, the estimated value of the Intensity of the AU15 is lower than the Intensity of the AU15 in the reference, and omission in detecting occurrence of the AU15 occurs. Moreover, a graph g2 illustrated in FIG. 11 indicates estimated values of the Intensity of the AU17. Comparing the graph g1 and the graph g2 illustrated in FIG. 11, a time period in which the Intensity of the AU15 is "high" and a time period in which the AU17 occurs are obviously synchronized. This means that the AU17 is likely to occur when the Intensity of the AU15 is "high". From those facts, it may be estimated that it is difficult to estimate the Intensity of the AU15 when the AU15 and the AU17 occur simultaneously with the marker 405 on the side of the mouth alone.

The graph G1 illustrated in FIG. 12 illustrates estimated values of the Intensity of the AU15 in a case of determining the Intensity of the AU15 on the basis of the change amount of the relative positional relationship between the marker 405 on the side of the mouth and the marker 406 on the lower lip. According to the graph G1 illustrated in FIG. 12, the Intensity of the AU15 in the reference and the estimated value of the Intensity of the AU15 substantially match with each other regardless of whether the Intensity of the AU15 is "low", "medium", or "large". Therefore, it may be said that it is obviously possible to determine the Intensity of the AU15 even when the AU15 and the AU17 occur simultaneously.

The AU Intensity determined as described above is output to the generation device 20 in association with the image captured by the RGB camera 31. In addition, the determination device 10 may store the captured image of the RGB camera 31 associated with the AU Intensity determined by the determination unit 143 in the storage unit 13 as the image 131 with the Intensity.

Figure 13:
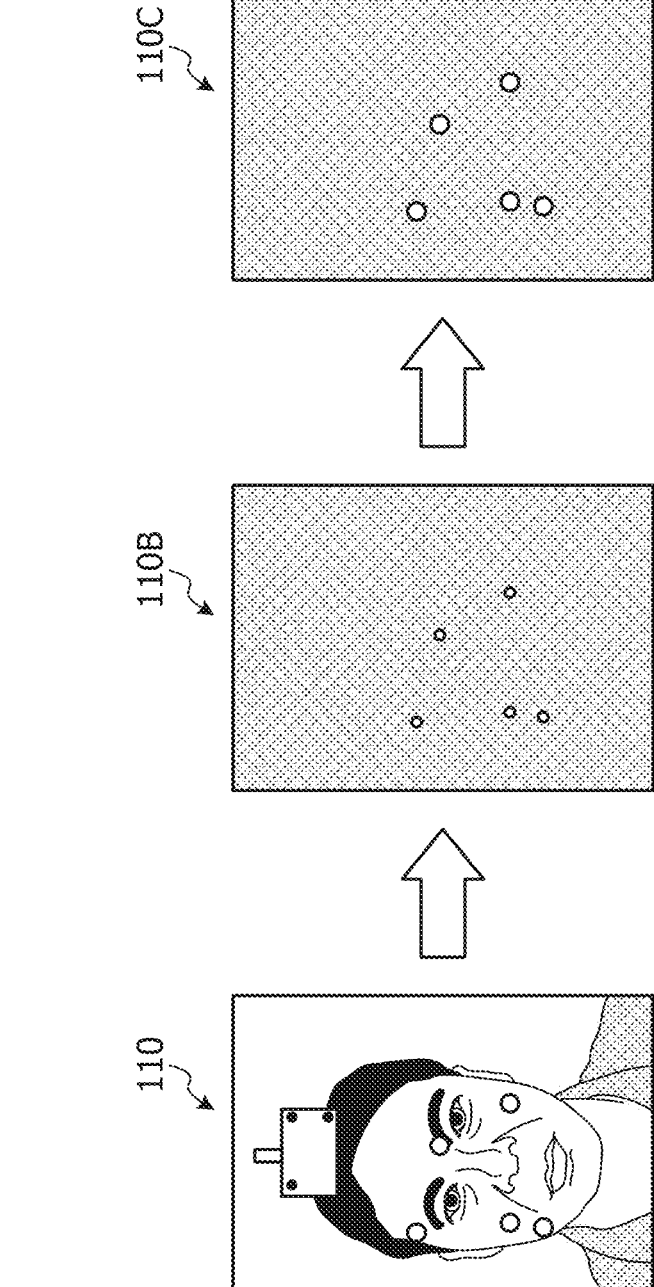
FIG. 13 is a diagram illustrating an exemplary method of creating a mask image.

Next, generation of training data executed by the generation device 20 will be described. The generation device 20 is capable of removing markers using a mask image. FIG. 13 is a diagram illustrating an exemplary method of creating the mask image. The image 110 in FIG. 13 is an image captured by the RGB camera 31. First, the generation device 20 extracts a color of a marker intentionally given in advance, and defines it as a representative color. Then, as illustrated in an image 110B in FIG. 13, the generation device 20 generates a region image of a color in the vicinity of the representative color. Moreover, as illustrated in an image 110C in FIG. 13, the generation device 20 performs a process of contraction, expansion, or the like on the color region in the vicinity of the representative color, and generates a mask image for removing the markers. Furthermore, the accuracy in extracting the marker color may be improved by setting the marker color that hardly exists as a facial color.

Figure 14:
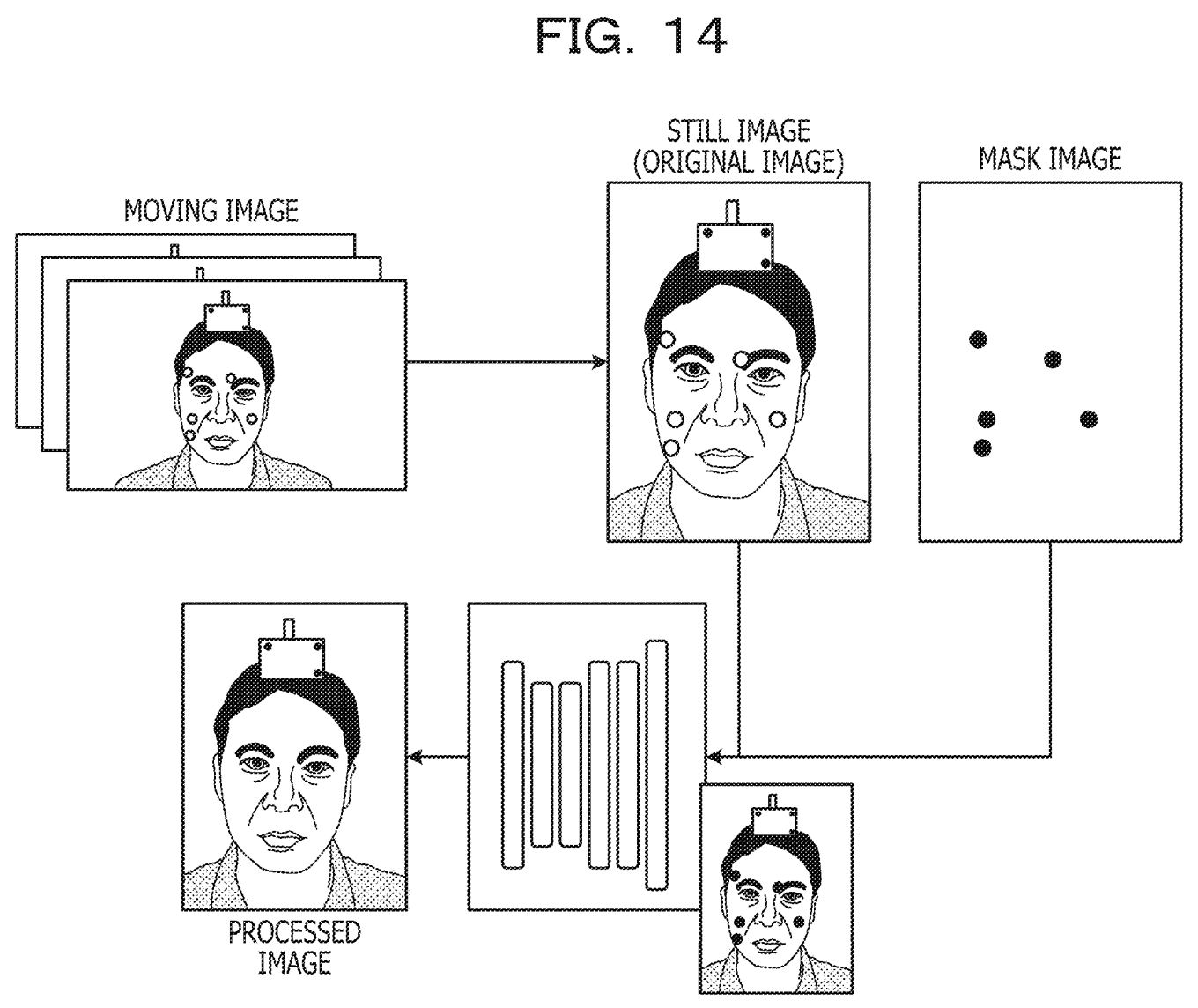

FIG. 14 is a diagram illustrating an exemplary method of marker deletion. As illustrated in FIG. 14, first, the generation device 20 applies a mask image to a still image obtained from a moving image. Moreover, the generation device 20 inputs the image to which the mask image is applied to, for example, a neural network, and obtains a processed image. Note that the neural network is assumed to have learned using an image of the subject with the mask, an image without the mask, and the like. Note that obtaining a still image from a moving image has an advantage that data in the middle of a change in facial expression may be obtained and that a large volume of data may be obtained in a short time. Furthermore, the generation device 20 may use generative multi-column convolutional neural networks (GMCNNs) or generative adversarial networks (GANs) as the neural network.

Note that the method by which the generation device 20 removes the markers is not limited to the one described above. For example, the generation device 20 may detect the marker position on the basis of a predetermined shape of the marker to generate a mask image. Furthermore, the relative positions of the IR camera 32 and the RGB camera 31 may be calibrated in advance. In this case, the generation device 20 is enabled to detect the marker position from information of marker tracking by the IR camera 32.

Furthermore, the generation device 20 may adopt a detection method that differs depending on a marker. For example, since the marker on the nose has little movement and its shape is easily recognized, the generation device 20 may detect the position by shape recognition. Furthermore, since the marker on the side of the mouth has a large movement and it is difficult to recognize its shape, the generation device 20 may detect the position by the method of extracting the representative color.

After the markers are removed in this manner, the generation device 20 assigns information regarding the first AU to the generated image, thereby generating training data for machine learning. For example, the generation device 20 assigns the AU Intensity determined by the determination unit 143 to the generated image, thereby generating the training data for machine learning. Furthermore, the machine learning device 50 may execute the machine learning by adding the training data generated by the generation device 20 to the existing training data.

For example, the training data may be used for machine learning of an estimation model that estimates the occurred AU using an image as an input. Furthermore, the estimation model may be a model specialized for each AU. In a case where the estimation model is specialized for a specific AU, the generation device 20 may change the generated training data to training data in which only the information regarding the specific AU is used as a teacher label. For example, for the image in which another AU different from the specific AU occurs, the generation device 20 may delete information regarding the another AU, and may add information indicating that the specific AU does not occur as a teacher label.

According to the present embodiment, it becomes possible to estimate needed training data. Enormous calculation costs are commonly needed to carry out machine learning. The calculation costs include a usage amount of a time, a graphics processing unit (GPU), and the like.

As the quality and the quantity of the data set improve, the accuracy of the model obtained by the machine learning improves. Therefore, the calculation costs may be reduced if it is possible to roughly estimate the quality and the quantity of the data set needed for the target accuracy in advance. Here, for example, the quality of the data set indicates a deletion rate and deletion accuracy of the markers. Furthermore, for example, the quantity of the data set indicates the number of data sets and the number of subjects.

There are combinations highly correlated with each other in the AU combinations. Accordingly, it is considered that the estimation made for a certain AU may be applied to another AU highly correlated with the AU. For example, the correlation between an AU18 and an AU22 is known to be high, and the corresponding markers may be common. Accordingly, if it is possible to estimate the quality and the quantity of the data set to the extent that the estimation accuracy of the AU18 reaches the target, it becomes possible to roughly estimate the quality and the quantity of the data set to the extent that the estimation accuracy of the AU22 reaches the target.

The machine learning model M generated by the machine learning device 50 may be provided to an estimation device (not illustrated) that estimates AU Intensity. The estimation device actually makes an estimation using the machine learning model M generated by the machine learning device 50. The estimation device may obtain an image in which a face of a person appears and Intensity of each AU is unknown, and may input the obtained image to the machine learning model M, whereby the AU Intensity output by the machine learning model M may be output to any output destination as an AU estimation result. As merely an example, such an output destination may be a device, a program, a service, or the like that estimates facial expressions using the AU Intensity or calculates comprehension and satisfaction.

Figure 15:
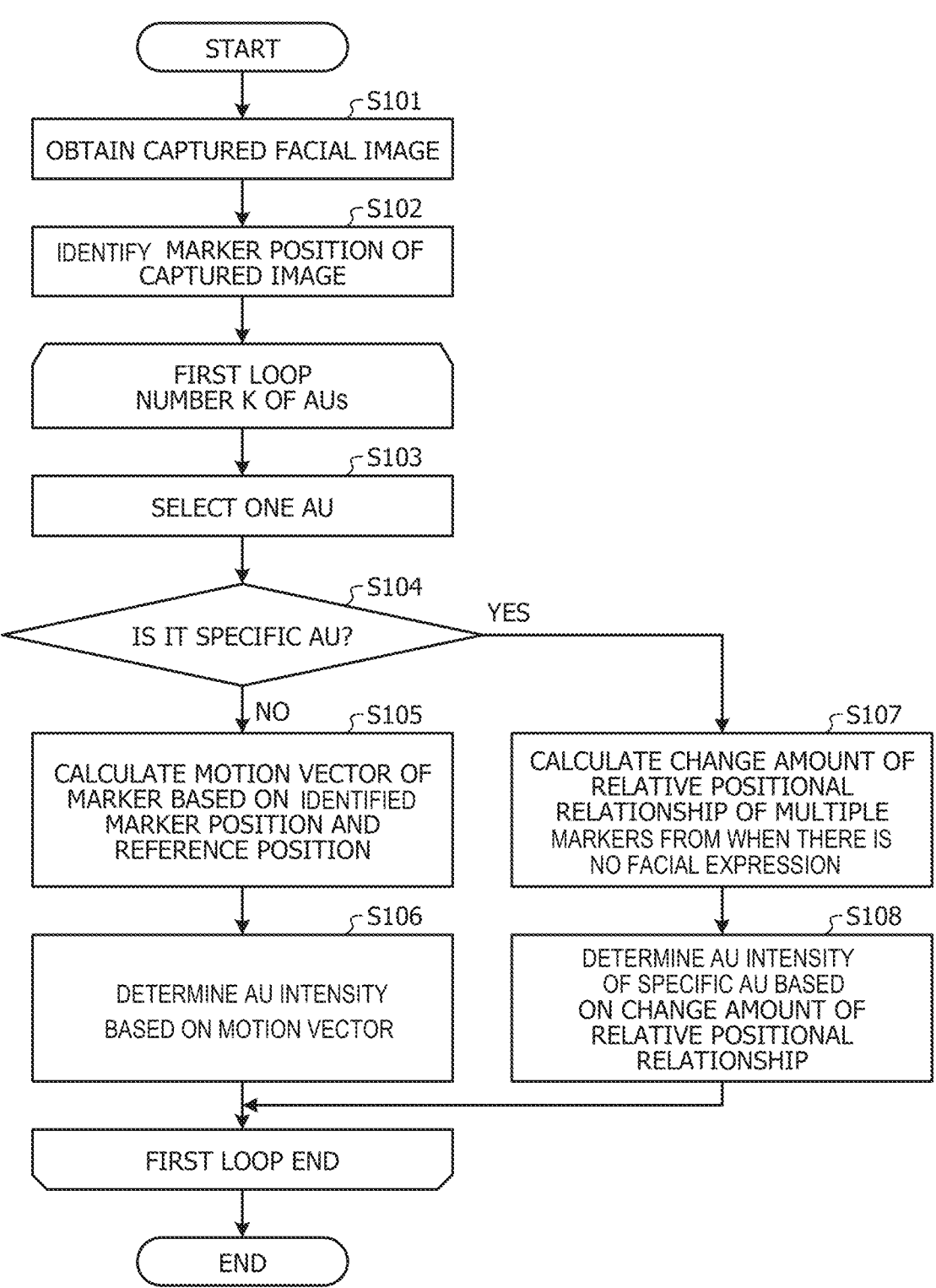
FIG. 15 is a flowchart illustrating a procedure for determining the Intensity.

Next, a processing flow of the determination device 10 will be described. FIG. 15 is a flowchart illustrating a procedure for determining the Intensity. As illustrated in FIG. 15, first, the determination device 10 obtains a captured image of the face of the subject (step S101). Next, the determination device 10 identifies positions of markers included in the captured image obtained in step S101 (step S102).

Then, the determination device 10 executes a first loop process that repeats the process of steps S103 to S108 for the number of times corresponding to the number K of AUs.

For example, the determination device 10 selects one AU (step S103). At this time, if the selected AU is not a specific AU (No in step S104), the determination device 10 executes the following process. For example, the determination device 10 calculates a motion vector of the marker on the basis of the reference position and the position of the marker assigned to estimate the selected AU among the marker positions identified in step S102 (step S105). Then, the determination device 10 determines AU Intensity on the basis of the motion vector (step S106).

On the other hand, if the selected AU is the specific AU (Yes in step S104), the determination device 10 executes the following process. For example, the determination device 10 calculates a change amount of the relative positional relationship of the plurality of markers on the basis of each of the positions of the plurality of markers assigned to estimate the specific AU among the marker positions identified in step S102 (step S107). Subsequently, the determination device 10 determines the Intensity of the specific AU on the basis of the inner product of the change amount of the relative positional relationship calculated in step S107 and the reference vector of the specific AU (step S108).

With such a first loop process repeated, it becomes possible to determine the Intensity for each AU. Note that, while a case where the process from step S103 to step S108 described above is executed as a loop process has been exemplified in the flowchart illustrated in FIG. 15, it is not limited to this, and the process may be executed in parallel for each AU.

Figure 16:
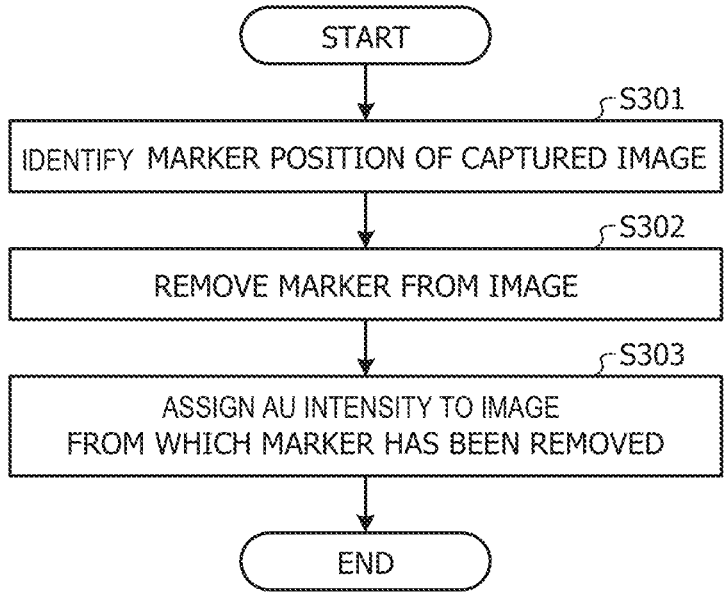
FIG. 16 is a flowchart illustrating a procedure for generating training data.

Next, a processing flow of the generation device 20 will be described. FIG. 16 is a flowchart illustrating a procedure for generating training data. As illustrated in FIG. 16, first, the generation device 20 identifies the marker positions in the captured image (step S301). The generation device 20 removes the markers from the image (step S302). Then, the generation device 20 assigns the AU Intensity to the image from which the markers have been removed (step S303).

As described above, the determination device 10 according to the present embodiment uses the relative positional relationship of the plurality of markers when there is no facial expression as a reference, and determines the Intensity of the specific AU on the basis of the change amount of the relative positional relationship at the time of the determination execution. Therefore, according to the determination device 10 according to the present embodiment, it becomes possible to determine the Intensity of the specific AU when the specific AU and another AU simultaneously occur.

Note that, although a case where each of the determination device 10, the generation device 20, and the machine learning device 50 is provided as an individual device has been exemplified in the embodiment described above, the determination device 10 may implement the function of the generation device 20, or may implement functions of both of the generation device 20 and the machine learning device 50.

Note that, in the embodiment described above, the descriptions have been given on the assumption that the determination unit 143 determines the AU Intensity on the basis of the marker movement amount. Meanwhile, the fact that the marker has not moved may also be a determination criterion of the Intensity by the determination unit 143.

Furthermore, an easily-detectable color may be arranged around the marker. For example, a round green adhesive sticker on which an IR marker is placed at the center may be attached to the subject. In this case, the generation device 20 is enabled to detect the round green area from the captured image, and to delete the area together with the IR marker.

Pieces of information including a processing procedure, a control procedure, a specific name, various types of data, and parameters described above or illustrated in the drawings may be optionally changed unless otherwise specified. Furthermore, the specific examples, distributions, numerical values, and the like described in the embodiment are merely examples, and may be changed in any ways.

Furthermore, each component of each device illustrated in the drawings is functionally conceptual, and is not necessarily be physically configured as illustrated in the drawings. For example, specific forms of distribution and integration of each device are not limited to those illustrated in the drawings. For example, all or a part of the devices may be configured by being functionally or physically distributed or integrated in any units according to various types of loads, usage situations, or the like. Moreover, all or any part of individual processing functions performed in each device may be implemented by a central processing unit (CPU) and a program analyzed and executed by the CPU, or may be implemented as hardware by wired logic.

Figure 17:
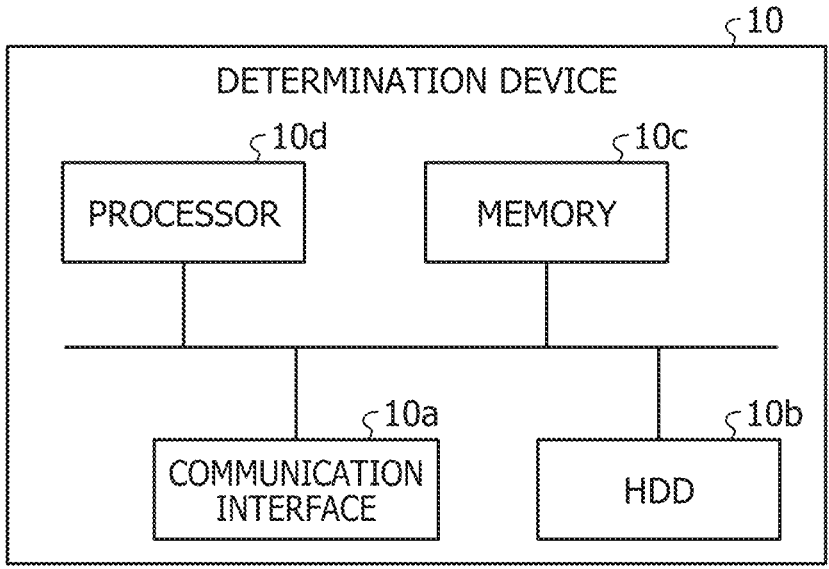
FIG. 17 is a diagram illustrating an exemplary hardware configuration.

FIG. 17 is a diagram illustrating an exemplary hardware configuration. As illustrated in FIG. 17, the determination device 10 includes a communication interface 10a, a hard disk drive (HDD) 10b, a memory 10c, and a processor 10d.

Furthermore, the individual units illustrated in FIG. 17 are mutually connected by a bus or the like.

The communication interface 10a is a network interface card or the like, and communicates with another server. The HDD 10b stores programs and databases (DBs) for operating the functions illustrated in FIG. 3.

The processor 10d is a hardware circuit that reads, from the HDD 10b or the like, a program for executing processing similar to the processing of each processing unit illustrated in FIG. 3, and loads it into the memory 10c to operate a process that executes each function described with reference to FIG. 3 or the like. For example, this process executes a function similar to that of each processing unit included in the determination device 10. For example, the processor 10d reads a program having functions similar to those of the acquisition unit 141, the identifying unit 142, and the determination unit 143 from the HDD 10b or the like. Then, the processor 10d executes a process for executing processing similar to that of the acquisition unit 141, the identifying unit 142, the determination unit 143, and the like.

As described above, the determination device 10 operates as an information processing apparatus that carries out a determination method by reading and executing a program. Furthermore, the determination device 10 may also implement functions similar to those of the embodiment described above by reading the program described above from a recording medium with a medium reading device and executing the read program described above. Note that the programs are not limited to being executed by the determination device 10. For example, the embodiment may be similarly applied to a case where another computer or server executes the program, or to a case where such computer and server cooperatively execute the program.

This program may be distributed via a network such as the Internet. Furthermore, this program may be recorded in a computer-readable recording medium such as a hard disk, a flexible disk (FD), a compact disc read only memory (CD-ROM), a magneto-optical disk (MO), a digital versatile disc (DVD), or the like, and may be executed by being read from the recording medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a program for causing a computer to execute a process, the process comprising:

obtaining an image that includes a face in which a first facial expression and a second facial expression occur simultaneously and a first marker corresponding to detection of the first facial expression is attached to a first position of the face and a second marker corresponding to detection of the second facial expression differs from the first facial expression is attached to a second position, different from the first position, of the face;

identifying the first position of the first marker included in the image and the second position of the second marker included in the image;

determining intensity of the first facial expression in the face based on a first difference between the first position and a first reference position corresponding to a position of the first marker in a no facial expression state in which the first facial expression of the face is neutral and a second difference between a first positional relationship between the first position and the second position and a second positional relationship between the first reference position and a second reference position corresponding to a position of the second marker in a no facial expression state in which the second facial expression of the face is neutral, extracting only a reference vector component of the first facial expression from a movement affected by movement that accompanies the occurrence of the second facial expression that occurs simultaneously; and outputting the determined intensity of the first facial expression in association with the image.

2. The non-transitory computer-readable recording medium according to claim 1, wherein the second difference corresponds to a difference between an amount of movement from the first reference position to the first position and an amount of movement from the second reference position to the second position.

3. The non-transitory computer-readable recording medium according to claim 1, the process further comprising:

generating training data to be used to train a machine learning model by assigning, as a correct answer label, the intensity of the first facial expression to an image obtained by removing the first marker and the second marker from the image.

4. The non-transitory computer-readable recording medium according to claim 3, the process further comprising:

executing machine learning that uses the image included in the training data as an explanatory variable of the machine learning model and the correct answer label included in the training data as an objective variable of the machine learning model.

5. The non-transitory computer-readable recording medium according to claim 1, wherein the first positional relationship and the second positional relationship are each defined by a difference in coordinates along a single predetermined axis.

6. A determination method, comprising:

obtaining, by a computer, an image that includes a face in which a first facial expression and a second facial expression occur simultaneously and a first marker corresponding to detection of the first facial expression is attached to a first position of the face and a second marker corresponding to detection of the second facial expression differs from the first facial expression is attached to a second position, different from the first position, of the face;

identifying the first position of the first marker included in the image and the second position of the second marker included in the image;

determining intensity of the first facial expression in the face based on a first difference between the first position and a first reference position corresponding to a position of the first marker in a no facial expression state in which the first facial expression of the face is neutral and a second difference between a first positional relationship between the first position and the second position and a second positional relationship between the first reference position and a second reference position corresponding to a position of the second marker in a no facial expression state in which the second facial expression of the face is neutral, extracting only a reference vector component of the first facial expression from a movement affected by movement that accompanies the occurrence of the second facial expression that occurs simultaneously; and outputting the determined intensity of the first facial expression in association with the image.

7. The determination method according to claim 6, wherein the second difference corresponds to a difference between an amount of movement from the first reference position to the first position and an amount of movement from the second reference position to the second position.

8. The determination method according to claim 6, further comprising:

generating training data to be used to train a machine learning model by assigning, as a correct answer label, the intensity of the first facial expression to an image obtained by removing the first marker and the second marker from the image.

9. The determination method according to claim 8, further comprising:

executing machine learning that uses the image included in the training data as an explanatory variable of the machine learning model and the correct answer label included in the training data as an objective variable of the machine learning model.

10. The determination method according to claim 6, wherein the first positional relationship and the second positional relationship are each defined by a difference in coordinates along a single predetermined axis.

11. An information processing apparatus, comprising:

a memory; and a processor coupled to the memory and the processor configured to:

obtain an image that includes a face in which a first facial expression and a second facial expression occur simultaneously and a first marker corresponding to detection of the first facial expression is attached to a first position of the face and a second marker corresponding to detection of the second facial expression differs from the first facial expression is attached to a second position, different from the first position, of the face;

identify the first position of the first marker included in the image and the second position of the second marker included in the image;

determine intensity of the first facial expression in the face based on a first difference between the first position and a first reference position corresponding to a position of the first marker in a no facial expression state in which the first facial expression of the face is neutral and a second difference between a first positional relationship between the first position and the second position and a second positional relationship between the first reference position and a second reference position corresponding to a position of the second marker in a no facial expression state in which the second facial expression of the face is neutral, extracting only a reference vector component of the first facial expression from a movement affected by movement that accompanies the occurrence of the second facial expression that occurs simultaneously; and output the determined intensity of the first facial expression in association with the image.

12. The information processing apparatus according to claim 11, wherein the second difference corresponds to a difference between an amount of movement from the first reference position to the first position and an amount of movement from the second reference position to the second position.

13. The information processing apparatus according to claim 11, wherein the processor is further configured to:

generate training data to be used to train a machine learning model by assigning, as a correct answer label, the intensity of the first facial expression to an image obtained by removing the first marker and the second marker from the image.

14. The information processing apparatus according to claim 13, wherein the processor is further configured to:

execute machine learning that uses the image included in the training data as an explanatory variable of the machine learning model and the correct answer label included in the training data as an objective variable of the machine learning model.

15. The information processing apparatus according to claim 11, wherein the first positional relationship and the second positional relationship are each defined by a difference in coordinates along a single predetermined axis.

\* \* \* \* \*